United States Patent
Du et al.

(10) Patent No.: US 12,056,818 B2
(45) Date of Patent: Aug. 6, 2024

(54) METHOD AND APPARATUS FOR RECONSTRUCTING 3D MODEL FROM 2D IMAGE, DEVICE AND STORAGE MEDIUM

(71) Applicant: PATSNAP LIMITED, Suzhou (CN)

(72) Inventors: Jia Du, Suzhou (CN); Shigenori Kawaai, Suzhou (CN); Xinting Gao, Suzhou (CN); Thiha Oo, Suzhou (CN); Xueyong Fu, Suzhou (CN); Markus Haense, Suzhou (CN)

(73) Assignee: PATSNAP LIMITED, Suzhou (CN)

( * ) Notice: Subject to any disclaimer, the term of this patent is extended or adjusted under 35 U.S.C. 154(b) by 334 days.

(21) Appl. No.: 17/532,016

(22) Filed: Nov. 22, 2021

(65) Prior Publication Data
US 2022/0157017 A1 May 19, 2022

Related U.S. Application Data

(63) Continuation of application No. PCT/CN2020/083988, filed on Apr. 9, 2020.

(30) Foreign Application Priority Data

May 21, 2019 (CN) .......................... 201910425084.6

(51) Int. Cl.
*G06T 17/10* (2006.01)
*G06T 7/50* (2017.01)

(52) U.S. Cl.
CPC ............ *G06T 17/10* (2013.01); *G06T 7/50* (2017.01); *G06T 2207/20081* (2013.01); *G06T 2207/20084* (2013.01); *G06T 2210/32* (2013.01)

(58) Field of Classification Search
CPC . G06T 17/10; G06T 7/50; G06T 2207/20081; G06T 2207/20084;
(Continued)

(56) References Cited

U.S. PATENT DOCUMENTS

2019/0114824 A1\* 4/2019 Martinez ............... G06T 15/205
2019/0130639 A1\* 5/2019 Boyce .................... G06F 3/013
(Continued)

FOREIGN PATENT DOCUMENTS

CN         107918950 A     4/2018
CN         108510573 A     9/2018
(Continued)

OTHER PUBLICATIONS

International Search Report issued in corresponding PCT Application No. PCT/CN2020/083988, dated Jul. 1, 2020.
(Continued)

*Primary Examiner* — Bobbak Safaipour
(74) *Attorney, Agent, or Firm* — Westbridge IP LLC

(57) ABSTRACT

Disclosed are a method, an apparatus, a device and a storage medium for reconstructing a 3D model from 2D images, comprising: obtaining two-dimensional images respectively corresponding to at least two viewing angles of a three-dimensional object; and inputting the two-dimensional images respectively corresponding to the at least two viewing angles into a set neural network for information fusion and 3D model reconstruction so as to obtain a 3D model of the three-dimensional object.

15 Claims, 4 Drawing Sheets

(58) Field of Classification Search
CPC ....... G06T 2210/32; G06T 7/55; G06T 17/00;
G06T 3/005; G06N 3/04; G06N 3/08
See application file for complete search history.

(56) References Cited

U.S. PATENT DOCUMENTS

| | | | |
|---|---|---|---|
| 2019/0304118 A1* | 10/2019 | Zhao | G06N 3/084 |
| 2020/0279411 A1* | 9/2020 | Atria | G06T 11/006 |
| 2021/0251590 A1* | 8/2021 | Guo | A61B 6/5229 |
| 2023/0154123 A1* | 5/2023 | Shi | G06T 19/006 |
| | | | 345/419 |

FOREIGN PATENT DOCUMENTS

| | | |
|---|---|---|
| CN | 109191369 A | 1/2019 |
| CN | 110148084 A | 8/2019 |
| WO | 2018146683 A1 | 8/2018 |

OTHER PUBLICATIONS

Wang, Research on 3D Reconstruction Technology and Its Application in the Aircraft Lofting Design, Doctor Thesis submitted to Nanjing University of Aeronautics and Astronautics, dated May 31, 2010.

Written Opinion issued in corresponding PCT Application No. PCT/CN2020/083988, dated Jul. 1, 2020.

Zhou, Model of Enhanced Web Search Engine for Specific Entities of Digital Literature, Libray Tribune, vol. 33, No. 2, pp. 111-115, dated Mar. 31, 2013.

* cited by examiner

METHOD AND APPARATUS FOR RECONSTRUCTING 3D MODEL FROM 2D IMAGE, DEVICE AND STORAGE MEDIUM

CROSS-REFERENCE TO RELATED APPLICATIONS

This application is a continuation of International Application No. PCT/CN2020/083988 filed on Apr. 9, 2020, which claims priority to Chinese Patent Application No. 201910425084.6, submitted to the China National Intellectual Property Administration on May 21, 2019, the entire contents of which are hereby incorporated by reference in this application.

TECHNICAL FIELD

The embodiments of this application relate to the field of image processing technology, such as a method, an apparatus, a device and a storage medium for reconstructing a three-dimensional (3D) model from two-dimensional (2D) images.

BACKGROUND

A large number of views are included in professional digital literatures (such as patent texts, journals, etc.) in order to enable readers to better understand the specific contents of the literatures. The views may be plan views, three-dimensional views, cross-sectional views, perspective views, or the like.

In the related art, when a three-dimensional object is described in a digital literature, views corresponding to multiple angles of the three-dimensional object, such as a front view, a top view, a left side view, a right side view, and a bottom view, are usually adopted. Although these views help users to understand the three-dimensional object from different angles, these views are separated and independent. It is usually not easy for readers to reconstruct the original three-dimensional object in their minds, thus failing to accurately understand the content of the literature.

SUMMARY

The embodiments of this application provide a method, an apparatus, a device, and a storage medium for reconstructing a 3D model from 2D images. Reconstructing a 3D model from 2D images in a digital literature can help readers to understand the contents of the literature accurately.

In a first aspect, embodiments of this application provide a method for reconstructing a 3D model from 2D images, comprising: obtaining two-dimensional images respectively corresponding to at least two viewing angles of a three-dimensional object; and inputting the two-dimensional images respectively corresponding to the at least two viewing angles into a set neural network for information fusion and 3D model reconstruction so as to obtain a 3D model of the three-dimensional object.

In a second aspect, embodiments of this application provide an apparatus for reconstructing a 3D model from 2D images, comprising: a two-dimensional image obtaining module configured to obtain two-dimensional images respectively corresponding to at least two viewing angles of a three-dimensional object; and a 3D model obtaining module configured to input the two-dimensional images respectively corresponding to the at least two viewing angles into a set neural network for information fusion and 3D model reconstruction so as to obtain a 3D model of the three-dimensional object.

In a third aspect, embodiments of this application also provide a computer device comprising a memory, a processor, and a computer program stored on the memory and capable of running on the processor, when the computer program is executed by the processor, the method of reconstructing a 3D model from 2D images according to the embodiments of this application is implemented.

In a fourth aspect, embodiments of this application also provide a computer-readable storage medium with a computer program stored thereon, and when the computer program is executed by a processor, the method of reconstructing a 3D model from 2D images according to the embodiments of this application is implemented.

DETAILED DESCRIPTION OF THE EMBODIMENTS

Figure 1:
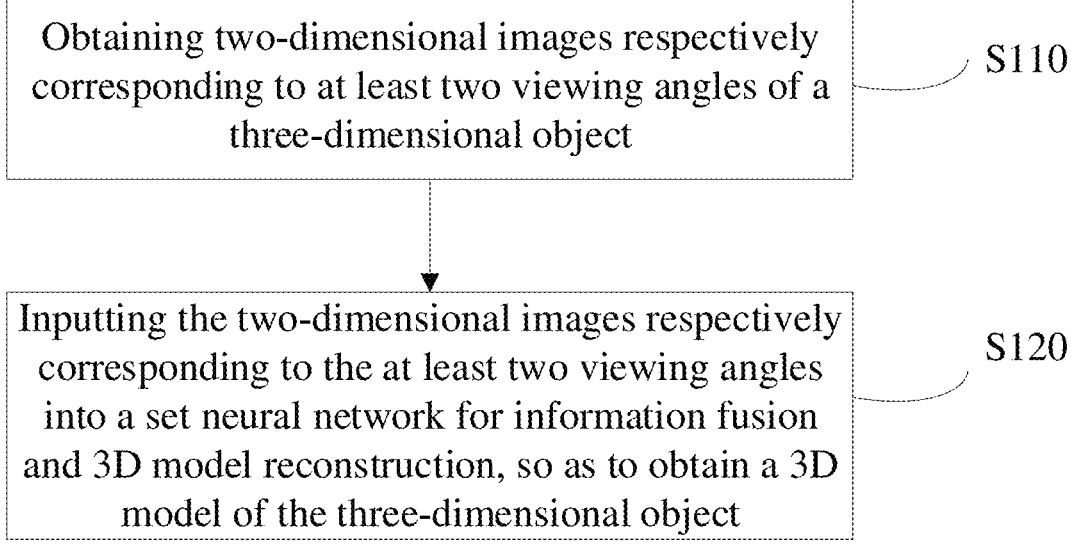
FIG. 1 is a flowchart of a method for reconstructing a 3D model from 2D images according to an embodiment of this application.

FIG. 1 is a flowchart of a method for reconstructing a 3D model from 2D images according to an embodiment of this application. This embodiment may be applied to a case of constructing a 3D model for a three-dimensional object. The method may be performed by an apparatus for reconstructing a 3D model from 2D images. The apparatus may be composed of hardware and/or software and can generally be integrated in a device with a function of reconstructing a 3D model from 2D images. The device may be an electronic device such as a server, a terminal, or a server cluster. As shown in FIG. 1, the method includes Step S110 to Step S120.

Step S110: obtaining two-dimensional images respectively corresponding to at least two viewing angles of a three-dimensional object.

Here, the two-dimensional images corresponding to the at least two viewing angles may include a front view, a top view, a left side view, a right side view, and a bottom view, etc., as well as a plan view, an elevation view, an oblique view, a perspective view, a cross-sectional view, an exploded view, a partial view, an enlarged view and so on. The three-dimensional object may be an object described in a digital literature. In a digital literature, in order to describe the three-dimensional object in detail, two-dimensional images respectively corresponding to at least two viewing angles of the three-dimensional object are shown in the literature.

In this embodiment, a method of obtaining the two-dimensional images respectively corresponding to the at least two viewing angles of the three-dimensional object may include: extracting initial two-dimensional images respectively corresponding to the at least two viewing angles of the three-dimensional object from the digital literature; preprocessing the initial two-dimensional images to obtain target two-dimensional images respectively corresponding to the at least two viewing angles respectively; and associating the target two-dimensional images with viewing angle information.

In an embodiment, a method of extracting the initial two-dimensional images respectively corresponding to the at least two viewing angles of the three-dimensional object from the digital literature may include: extracting image title parts from the digital literature; and standardizing the image titles to obtain image types of the initial two-dimensional images. For example, information of drawing description is firstly located in the digital literature, then drawing descriptions and drawing numbers are extracted from the located information of drawing description, finally, image types of the two-dimensional images are obtained from the extracted information of drawing description, and the image types are standardized, the image types of the standardized two-dimensional images are taken as the image types of the initial two-dimensional images, where an image type is a type of the view of the drawing. In this embodiment, extracting image title parts from the digital literature and standardizing the image titles to obtain the image types of the initial two-dimensional images may be implemented in sequence by using a technology of locating information of drawing description, a technology of extracting a drawing description, a technology of extracting a drawing number, and a technology of recognizing a type of a view of a drawing.

A method of locating the information of drawing description in the digital literature may include: dividing a content of a set part of the digital literature into multiple content pairs using a content parser, a content pair including a section title and a section content; and locating the information of drawing description based on a preset category table according to the section titles.

Here, the set part may be a description part in a patent literature or a text part in a non-patent literature. For example, a principle of locating the information of drawing description is as follows: the descriptions of most patents usually contain a section of drawing description ("BRIEF DESCRIPTION OF DRAWINGS"), and the drawing description may be directly parsed from this section. The entire patent description is divided into content pairs including "section titles" and "section contents" by using a description parser. Then the category corresponding to each section is looked up in the preset category table according to the "section titles". Table 1 is a preset category table in this embodiment.

TABLE 1

| Section Name | ID |
| --- | --- |
| TECHNICAL HELD | 1 |
| BACKGROUND ART | 2 |
| SUMMARY OF INVENTION | 3 |
| TECHNICAL PROBLEM | 3.1 |
| SOLUTION TO PROBLEM | 3.2 |
| ADVANTAGEOUS EFFECTS OF INVENTION | 3.3 |
| BRIEF DESCRIPTION OF DRAWINGS | 4 |
| DETAILED DESCRIPTION OF THE INVENTION | 5 |

TABLE 1-continued

| Section Name | ID |
| --- | --- |
| DESCRIPTION OF EMBODIMENTS | 5 |
| EXAMPLES | 5 |
| BEST MODE OF CARRYING OUT THE INVENTION | 5 |
| INDUSTRIAL APPLICABILITY | 6 |
| REFERENCE SIGNS LIST | 7 |
| REFERENCE TO DEPOSITED BIOLOGICAL MATERIAL | 8 |
| SEQUENCE LISTING FREE TEXT | 9 |
| CITATION LIST | 10 |
| PATENT LITERATURE | 10.1 |
| NON PATENT LITERATURE | 10.2 |

After the patent description is parsed by the parser, only the section "BRIEF DESCRIPTION OF DRAWINGS" needs to be processed. According to statistics, patents that have the section "BRIEF DESCRIPTION OF DRAWINGS" account for only 55% of all patents. Therefore, the 55% of patents can be efficiently analyzed. For the remaining 45% of patents, the entire patent descriptions need to be parsed. During parsing, a case that a same drawing is described by two sentences in a patent will usually be encountered. In this case, it is usually intended to select the shorter sentence as the introduction information for the patent drawing.

A method of extracting the drawing description and the drawing numbers from the located information of drawing description includes: extracting the drawing description using a pre-built Regular Expression; obtaining a drawing numbering mode using a mode matching method, and extracting the drawing numbers according to the drawing numbering mode.

Here, the drawing numbering mode includes a first mode and a second mode. The drawing number of the first mode is composed of at least one separated number, and the drawing number of the second mode is composed of a number range. In the case of the drawing numbering mode being the first mode, extracting the drawing numbers according to the drawing numbering mode includes: extracting at least one separated number, and determining the at least one separated number as the drawing number. In the case of the drawing numbering mode being the second mode, extracting the drawing numbers according to the drawing numbering mode includes: dividing the number range, obtaining multiple numbers included in the number range, and determining the multiple numbers included in the number range as the drawing numbers.

For example, a principle of extracting the drawing description may be as follows.

Figure 2:
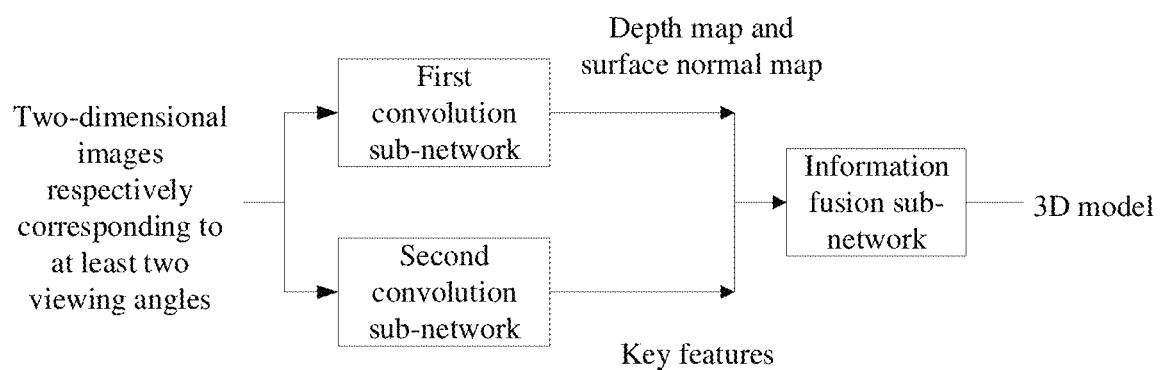
FIG. 2 is a schematic structural diagram of a set neural network according to an embodiment of this application.

The drawing description in English patent literatures is usually written in the following ways:

FIG. 1 is a front, bottom, and left side perspective view of a confection. FIG. 2 is a bottom plan view thereof.

FIG. 11 depict another embodiment of a supply-switched dual cell memory bitcell according to the present description.

FIGS. 3A, B, C are views illustrating a technique for determining a queue for storing data according to an exemplary embodiment.

FIG. 1 illustrates a system that can be used to block the opening of a file.

Figure 6:
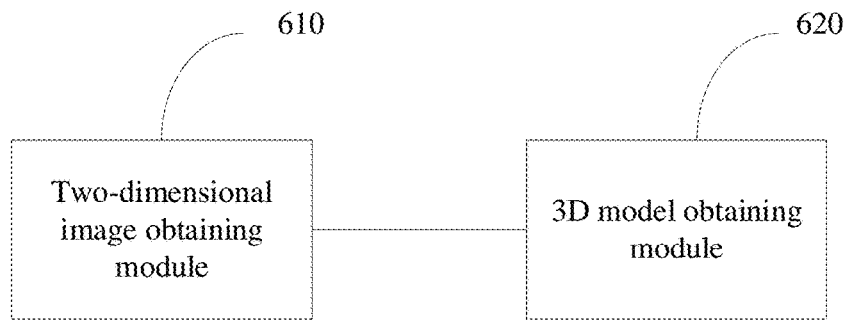
FIG. 6 is a schematic structural diagram of an apparatus for reconstructing a 3D model from 2D images according to an embodiment of this application.

FIGS. 6(*a*) to (*c*) are plan views that illustrate the structure of principal parts of a second exemplary embodiment of the illumination optical system according to the present invention, and FIGS. 6 (*d*) to (*f*) are plan views that illustrate the structure of principal parts of a third exemplary embodiment of the illumination optical system according to the present invention.

FIG. 9A is a perspective view, depicting another embodiment of the second anchoring member.

As shown in the examples above, a typical drawing description will start with "FIG" or "FIGS", followed by a number, and then a verb: be, show or illustrate. Based on this mode, a constructed Regular Expression is used to extract sentences related to the drawing description.

For example, a principle of extracting the drawing numbers may be as follows.

In order to link the text and images of the drawings, a mode matching method is used to extract the numbers corresponding to the drawings from the drawing description.

In the following cases, mode matching can easily extract the drawing numbers:

FIG. 1 is a front, bottom, and left side perspective view of a confection.

FIG. 2 is a bottom plan view thereof.

Then, for the case where the drawing number is a number range, the following is an example:

FIGS. 8A-8D are aspects of a user interface for administration of a buddy list.

Figure 4:
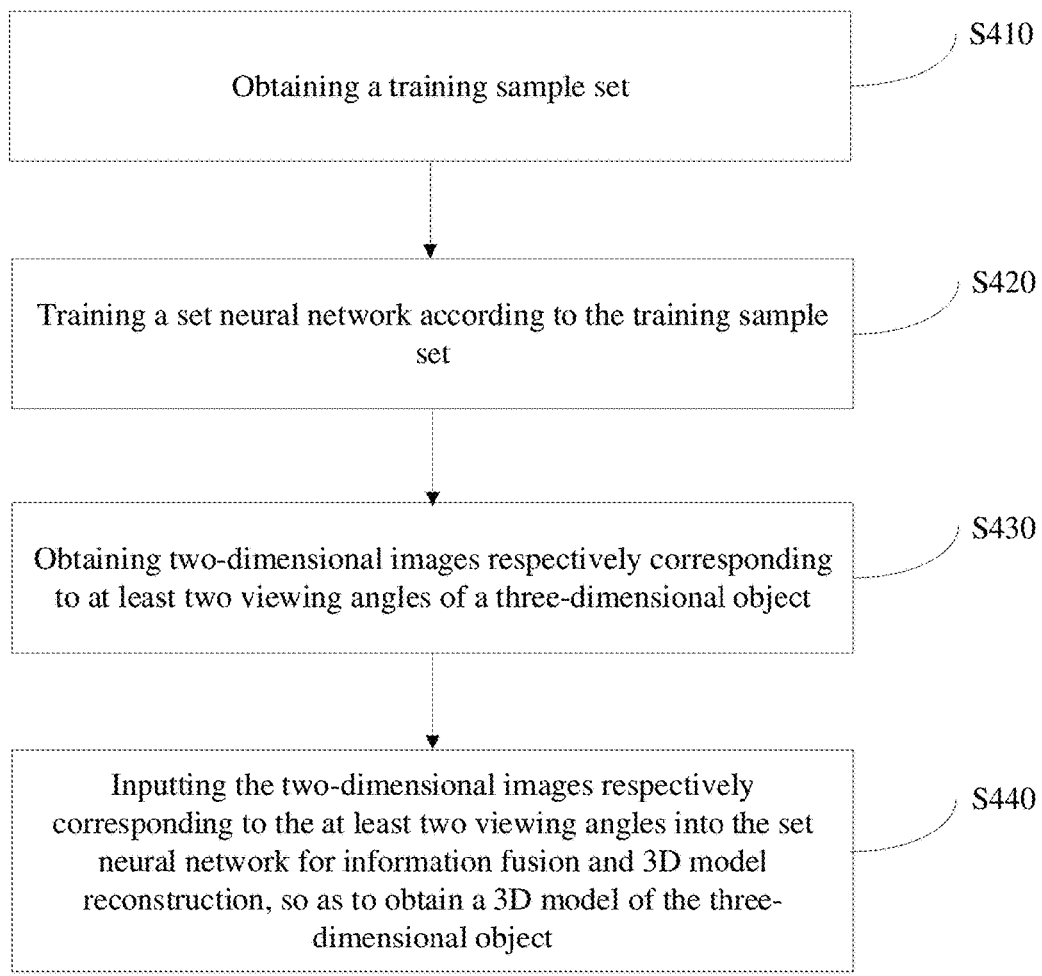
FIG. 4 is a flowchart of another method for reconstructing a 3D model from 2D images according to an embodiment of this application.
Figure 5:
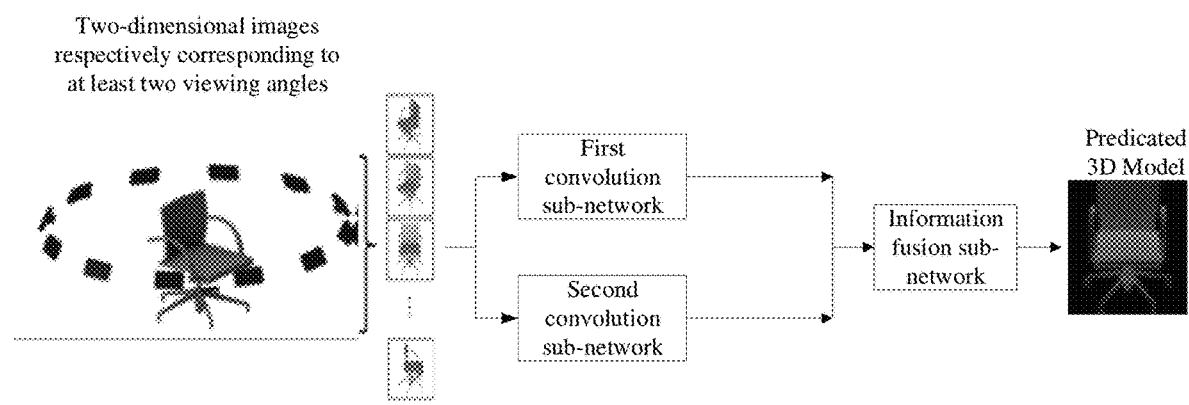
FIG. 5 is an example diagram of training a set neural network according to an embodiment of this application.

In the above example, "8A-8D" can be extracted firstly, and then a numbering divider is used. For example, "comma", "and" and "or" are used to list independent numbers, while "-" and "to" indicate the range between two numbers. The number not only contains data, but also a combination of numbers and letters, and a combination of numbers and parentheses. In this embodiment, the numbers of the drawings may be automatically processed to generate a list of all numbers, as shown in the following examples:

FIGS. 4 and 5 are user interfaces for inviting a "buddy" to join in practicing aspects of the present invention. =>['4', '5']

FIGS. 8A-8D are aspects of a user interface for administration of a buddy list. =>['8A', '8B', '8C', '8D']

FIGS. 9(A)-9(C) are views of the manufacturing steps shown by magnifying a via conductor and a bump in a printed wiring board of the first embodiment; =>['9(A)', '9(B)', '9(C)']

For example, a principle of recognizing the drawing view types may be as follows.

Usually, the drawing description contains a description of the view types, as in the following examples:

FIG. 1 is a front, bottom, and left side perspective view of a confection.

FIG. 2 is a bottom plan view thereof.

FIG. 1 is a conceptual cross-sectional view of an example article including CMC.

Firstly the drawing types are obtained, and then the view types are standardized.

In this embodiment, the types of drawings may be sorted into the following types, for example, as shown in Table 2.

TABLE 2

Standardized View Types

| Category | Sub-category | Description | JP | CN | EN (Other examples) |
|---|---|---|---|---|---|
| plan view | top, bottom, top down, bottom up, | an orthographic projection of a 3-dimensional object from the position of a horizontal plane | 平面图 | 平面图 | |
| elevational view | side, lateral, front, back, rear, left, right, end, | an orthographic projection of a 3-dimensional object from the position of a vertical plane | 立面图 | 立体图 | elevation view<br>side view<br>front view<br>left view<br>left side view<br>end view<br>side elevation view<br>left side elevational view<br>vertical view<br>orthogonal view<br>frontal view |
| perspective view | | a three dimensional representation of the invention from an angle to showing depth. | 斜视图, 透视图 | 透视图 | oblique view<br>isometric |
| sectional view | | a view to show the internal parts and components of a device. | 呼面图, 切欠图 | 切山图 | section view<br>cutaway view<br>cross-sectional view<br>cross section view |
| schematic view | | a representation of the elements of a system using abstract, graphic symbols rather than realistic pictures | 概略图 | 示意图 | external view |
| exploded view | — | a view to show the relationship and order of parts man assembly. | 分解图 | 分解图 | |
| partial view | — | a broken/partial views of entirety machine or | 部分图 | 局部图 | |

TABLE 2-continued

Standardized View Types

| Category | Sub-category | Description | JP | CN | EN (Other examples) |
|---|---|---|---|---|---|
| enlarged view | — | a view to give greater scope devices | 拡大図 | 放大图 | expanded view |
| others | — | — | 説明図<br>詳細図<br>線図<br>レイアウト図<br>概念図<br>例示図 | 说明图<br>详细图<br>线图<br>概念图<br>示例图 | explanatory view<br>detailed view<br>diagrammatic view<br>layout view<br>conceptual view<br>exemplary view |

Digital literatures may be patent literatures or non-patent literatures such as periodicals. The target two-dimensional images may be images composed of regions of interest in the initial two-dimensional images. A method of associating the target two-dimensional images with the viewing angle information may include adding viewing angle labels to the target two-dimensional images. For example, in the case that a target two-dimensional image A is a left side view of a three-dimensional object, a label of "left side view" is added to the target two-dimensional image A.

In an embodiment, the initial two-dimensional images are preprocessed respectively to obtain the target two-dimensional images respectively corresponding to the at least two viewing angles, which may be implemented in the following way: preforming image cropping on the initial two-dimensional images to obtain the target two-dimensional images respectively corresponding to the at least two viewing angles. Correspondingly, associating the target two-dimensional images with the viewing angle information includes: obtaining view types of the target two-dimensional images respectively corresponding to the at least two viewing angles after being orthogonal projected, and determining the view types of the target two-dimensional images respectively corresponding to the at least two viewing angles after being orthogonal projected as the viewing angle information; and associating the target two-dimensional images with the viewing angle information.

Here, a method of cropping may adopt a morphological segmentation algorithm or an object detection algorithm.

Step S120: inputting the two-dimensional images respectively corresponding to the at least two viewing angles into a set neural network for information fusion and 3D model reconstruction, so as to obtain a 3D model of the three-dimensional object.

Here, it is assumed that the set neural network has an ability to perform the information fusion and the 3D model reconstruction of two-dimensional images.

In one embodiment, after associating the target two-dimensional images corresponding to the at least two viewing angles with the viewing angle information, that is, after adding the viewing angle labels to the target two-dimensional images, the target two-dimensional images are inputted into the set neural network to perform the information fusion and the 3D model reconstruction, so as to obtain the 3D model of the three-dimensional object.

FIG. 2 is a schematic structural diagram of a set neural network according to an embodiment of this application. As shown in FIG. 2, a set neural network includes a first convolution sub-network, a second convolution sub-network and an information fusion sub-network; both the first convolution sub-network and the second convolution sub-network are connected to the information fusion sub-network.

The process of inputting the two-dimensional images respectively corresponding to the at least two viewing angles into the set neural network to perform information fusion and 3D model reconstruction to obtain a 3D model of the three-dimensional object may include: inputting the two-dimensional images respectively corresponding to the at least two viewing angles into the first convolution sub-network to obtain a depth map and a surface normal map; inputting the two-dimensional images respectively corresponding to the at least two viewing angles into the second convolution sub-network for feature extraction to obtain key features; and inputting the depth map, the surface normal map and the key features into the information fusion sub-network to perform the information fusion and the 3D model reconstruction so as to obtain the 3D model of the three-dimensional object.

Here, the key features can include key points, edges, and curved surfaces in each two-dimensional image. The first convolution sub-network can predict the depth map and the surface normal map according to the two-dimensional images corresponding to the at least two viewing angles. The second convolutional neural network can extract the key features according to the two-dimensional images corresponding to the at least two viewing angles. The information fusion sub-network can construct the 3D model after information fusion of the input depth map, the surface normal map and the key features.

Here, the 3D model may be a 3D point cloud, a grid 3D surface, or a Computer-Aided Design (CAD) model. In an embodiment, the information fusion sub-network may perform information fusion on the inputted depth map, the inputted surface normal map, and the inputted key features to obtain a 3D point cloud, and then mesh the 3D point cloud to obtain a grid 3D surface.

In the case of the 3D model being a CAD model, the process of inputting the depth map, the surface normal map and the key features into the information fusion sub-network for the information fusion and the 3D model reconstruction so as to obtain the CAD model may include: aligning the depth map and the surface normal map respectively with the key features to obtain a vector form of the key features; and generating the CAD model according to the vector form of the key features.

Figure 3:
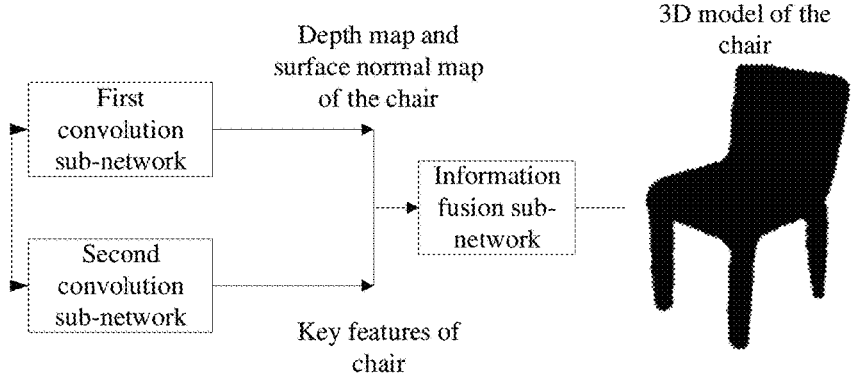
FIG. 3 is an example diagram of generating a 3D model of a chair according to an embodiment of this application.

For example, FIG. 3 is an example diagram of generating a 3D model of a chair according to an embodiment of this application. As shown in FIG. 3, two-dimensional images respectively corresponding to at least two viewing angles of the chair are inputted into a set neural network to perform information fusion and 3D model reconstruction to obtain a 3D model of the chair.

In an embodiment, after the 3D model of the three-dimensional object is obtained, the following steps are further implemented: after associating the 3D model with the digital literature, storing the 3D model in a database, and establishing search index information for the 3D model; searching the digital literature associated with the 3D model according to 3D model searching information inputted by a user; or, conducting CAD modeling according to the 3D model; or, conducting 3D printing according to the 3D model.

In an embodiment, after the 3D model is generated, the 3D model is stored in a database, and binary index information of the 3D model is established. When the user uses the 3D model as the search information, the search engine can search the associated digital literature according to the inputted 3D model or retrieve the 3D model from the database, so that the user can obtain the corresponding 3D model according to the index information.

In an embodiment, after the 3D model is obtained, the 3D model may be used in a user interactive graphical interface to conduct advanced visualization and searching the digital literature may be based on the 3D model. The 3D model may also be exported for prototyping, such as 3D printing, or be used for CAD modeling.

In the technical solution of this embodiment, firstly two-dimensional images respectively corresponding to at least two viewing angles of a three-dimensional object are obtained, and then the two-dimensional images respectively corresponding to the at least two viewing angles are inputted into a set neural network for information fusion and 3D model reconstruction to obtain a 3D model of the three-dimensional object. In the method for reconstructing a 3D model from 2D images according to the embodiments of the present application, the two-dimensional images respectively corresponding to the at least two viewing angles are inputted into the set neural network for information fusion and 3D model reconstruction so as to obtain the 3D model of the three-dimensional object, which not only improves accuracy of the reconstructed 3D models, but also makes it easier for users to understand the three-dimensional object by viewing the 3D model.

FIG. 4 is a flowchart of another method for reconstructing a 3D model from 2D images according to an embodiment of this application. As an explanation of the foregoing embodiment, as shown in FIG. 4, the method includes Step S410 to Step S440.

Step S410: obtaining a training sample set.

The training sample set includes multiple reference 3D models and two-dimensional images respectively corresponding to at least two viewing angles based on the multiple reference 3D models. Here, the reference 3D models are obtained by 3D extraction for a real three-dimensional object.

Step S420: training a set neural network according to the training sample set.

In an embodiment, a process of training the set neural network according to the training sample set may include: inputting the two-dimensional images corresponding to the at least two viewing angles into a first convolution sub-network to obtain a training depth map and a training surface normal map; inputting the two-dimensional images corresponding to the at least two viewing angles into a second convolution sub-network for feature extraction to obtain training key features; inputting the training depth map, the training surface normal map, and the training key features into an information fusion sub-network for information fusion and 3D model reconstruction to obtain a predicted 3D model; adjusting parameters in the set neural network according to the predicted 3D model and the reference 3D models, until the training ends.

In this embodiment, a method of adjusting the parameters in the set neural network according to the predicted 3D model and the reference 3D models may include: calculating a loss function according to the predicted 3D model and the reference 3D models, and then adjusting the parameters in the set neural network according to the loss function until a value of the loss function meets a set condition, then the training of the set neural network ends.

FIG. 5 is an example diagram of training the set neural network according to an embodiment of this application. As shown in FIG. 5, the two-dimensional images corresponding to the at least two viewing angles based on the reference 3D models are inputted into the set neural network for information fusion and 3D model reconstruction to obtain the predicted 3D model.

Step S430: obtaining two-dimensional images respectively corresponding to at least two viewing angles of a three-dimensional object.

Step S440: inputting the two-dimensional images respectively corresponding to the at least two viewing angles into the set neural network for information fusion and 3D model reconstruction to obtain a 3D model of the three-dimensional object.

In the technical solutions according to this embodiment, the set neural network is trained according to the training sample set, which can improve accuracy of the 3D model reconstructed by the set neural network.

FIG. 6 is a schematic structural diagram of an apparatus for reconstructing a 3D model from 2D images according to an embodiment of this application. As shown in FIG. 6, the apparatus includes: a two-dimensional image obtaining module 610 and a 3D model obtaining module 620.

The two-dimensional image obtaining module 610 is configured to obtain two-dimensional images respectively corresponding to at least two viewing angles of a three-dimensional object.

The 3D model obtaining module 620 is configured to input the two-dimensional images respectively corresponding to the at least two viewing angles into a set neural network to perform information fusion and 3D model reconstruction so as to obtain a 3D model of the three-dimensional object.

In an embodiment, the two-dimensional image obtaining module 610 is further configured to: extract initial two-dimensional images respectively corresponding to the at least two viewing angles of the three-dimensional object from a digital literature; preprocess the initial two-dimensional images based on a morphological segmentation algorithm or an object detection algorithm to obtain target two-dimensional images respectively corresponding to the at least two viewing angles; and associate the target two-dimensional images with viewing angle information.

In an embodiment, the 3D model obtaining module 620 is further configured to input the target two-dimensional images associated with the viewing angle information into a set neural network to perform information fusion and 3D model reconstruction.

In an embodiment, the two-dimensional image obtaining module 610 is further configured to extract image title parts from the digital literature; and standardize the image titles to obtain image types of the initial two-dimensional images.

In an embodiment, the two-dimensional image obtaining module 610 is further configured to: locate information of drawing description in the digital literature; extract drawing descriptions and drawing numbers from the located information of drawing description; obtain image types of the two-dimensional images from the extracted information of drawing description, and standardize the image types, take the image types of the standardized two-dimensional images as the image types of the initial two-dimensional images.

In an embodiment, the two-dimensional image obtaining module 610 is further configured to: divide a content of a set part of the digital literature into multiple content pairs using a content parser, a content pair including a section title and a section content; and locate the information of drawing description based on a preset category table according to the section titles.

In an embodiment, the two-dimensional image obtaining module 610 is further configured to: extract the drawing description using a pre-built Regular Expression; obtaining a drawing numbering mode using a mode matching method, and extracting the drawing numbers according to the drawing numbering mode.

In an embodiment, the drawing numbering mode includes a first mode and a second mode. The drawing number of the first mode is composed of at least one separated number, and the drawing number of the second mode is composed of a number range. In the case of the drawing numbering mode being the first mode, extracting the drawing numbers according to the drawing numbering mode includes: extracting at least one separated number, and determining the at least one separated number as the drawing number. In the case of the drawing numbering mode being the second mode, extracting the drawing numbers according to the drawing numbering mode includes: dividing the number range, obtaining multiple numbers included in the number range, and determining the multiple numbers included in the number range as the drawing numbers.

In an embodiment, the two-dimensional image obtaining module 610 is further configured to: preform image cropping on the initial two-dimensional images to obtain the target two-dimensional images respectively corresponding to the at least two viewing angles.

Correspondingly, associating the target two-dimensional images with the viewing angle information includes: obtain view types of the target two-dimensional images respectively corresponding to the at least two viewing angles after being orthogonal projected, and determine the view types of the target two-dimensional images respectively corresponding to the at least two viewing angles after being orthogonal projected as the viewing angle information; and associate the target two-dimensional images with the viewing angle information.

In an embodiment, the set neural network includes a first convolution sub-network, a second convolution sub-network and an information fusion sub-network; both the first convolution sub-network and the second convolution sub-network are connected to the information fusion sub-network.

The 3D model obtaining module 620 is further configured to: input the two-dimensional images respectively corresponding to the at least two viewing angles into the first convolution sub-network to obtain a depth map and a surface normal map; input the two-dimensional images respectively corresponding to the at least two viewing angles into the second convolution sub-network for feature extraction to obtain key features; and input the depth map, the surface normal map and the key features into the information fusion sub-network to perform the information fusion and the 3D model reconstruction so as to obtain the 3D model of the three-dimensional object.

In an embodiment, the 3D model includes at least one of the following: a 3D point cloud, a grid 3D surface, and a CAD model.

In an embodiment, in the case of the 3D model being a CAD model, the 3D model obtaining module 620 is further configured to: align the depth map and the surface normal map respectively with the key features to obtain a vector form of the key features; and generate the CAD model according to the vector form of the key features.

In an embodiment, the apparatus further includes a set neural network training module, which is configured to: obtain a training sample set, the training sample set including multiple reference 3D models and two-dimensional images respectively corresponding to at least two viewing angles based on the multiple reference 3D models; and train the set neural network according to the training sample set.

In an embodiment, the set neural network training module is further configured to:

input the two-dimensional images corresponding to the at least two viewing angles into the first convolution sub-network to obtain a training depth map and a training surface normal map; input the two-dimensional images corresponding to the at least two viewing angles into the second convolution sub-network for feature extraction to obtain training key features; input the training depth map, the training surface normal map, and the training key features into the information fusion sub-network for information fusion and 3D model reconstruction to obtain a predicted 3D model; adjust parameters in the set neural network according to the predicted 3D model and the reference 3D models, until the training ends.

In an embodiment, the apparatus further comprises a 3D model application module, which is configured to: store the 3D model in a database after associating the 3D model with the digital literature, and establish search index information for the 3D model; search the digital literature associated with the 3D model according to 3D model searching information inputted by a user; or, conducting CAD modeling according to the 3D model; or, conducting 3D printing according to the 3D model.

The foregoing apparatus can execute the methods provided in all the foregoing embodiments of this application. For technical details that are not described in detail in this embodiment, please refer to the methods provided in all the foregoing embodiments of this application.

Figure 7:
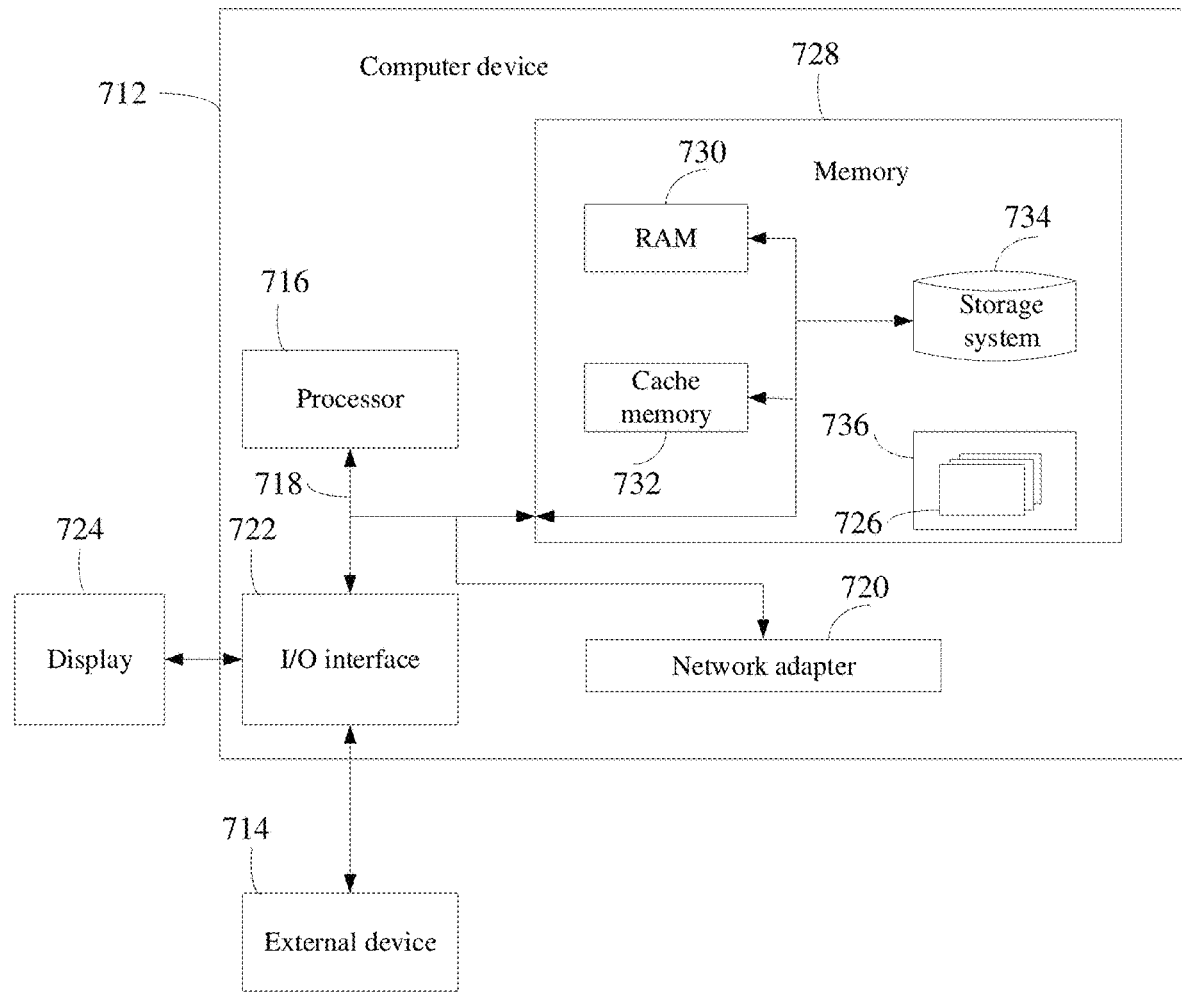
FIG. 7 is a schematic structural diagram of a computer device according to an embodiment of this application.

FIG. 7 is a schematic structural diagram of a computer device according to an embodiment of this application. FIG. 7 shows a block diagram of a computer device 712 suitable for implementing the embodiments of this application. The computer device 712 shown in FIG. 7 is only an example and should not bring any limitation to the function and scope of use of the embodiments of this application. The device 712 is typically a computing device that undertakes the function of reconstructing a 3D model from 2D images.

As shown in FIG. 7, the computer device 712 is represented in the form of a general-purpose computing device. The components of the computer device 712 may include but are not limited to: at least one processor 716, a memory 728, and a bus 718 connecting different system components (including the memory 728 and the processor 716).

The bus 718 represents at least one of several types of bus structures, including a memory bus or a memory controller, a peripheral bus, a graphics acceleration port, a processor, or a local bus using any bus structure among multiple bus structures. For example, these architectures include but are not limited to Industry Standard Architecture (ISA) buses, Micro Channel Architecture (MCA) buses, enhanced ISA buses, Video Electronics Standards Association (VESA) local buses and Peripheral Component Interconnect (PCI) buses.

The computer device 712 typically includes a variety of computer system readable media. These media may be any available media that may be accessed by the computer device 712, including transitory and non-transitory media, removable and non-removable media.

The memory 728 may include a computer system readable medium in the form of a transitory memory, such as a Random Access Memory (RAM) 730 and/or a cache memory 732. The computer device 712 may further include other removable/non-removable, transitory/non-transitory computer system storage media. Only for exemplary purpose, the storage system 734 may include a hard disk drive (not shown in FIG. 7) for reading and writing non-removable, non-transitory magnetic media. Although not shown in FIG. 7, a magnetic disk driver for reading and writing a removable, non-transitory magnetic disk (e.g., "floppy disk") and a compact disk driver for reading and writing a removable, non-transitory optical disk, e.g., a Compact Disc-Read Only Memory (CD-ROM), a Digital Video Disc-Read Only Memory (DVD-ROM) or another optical media, can be provided. In these cases, each drive may be connected to the bus 718 via at least one data medium port. The memory 728 may include at least one program product, and the program product has a set of (for example, at least one) program modules, and these program modules are configured to perform the functions of the embodiments of this application.

A program 736 having a set of (at least one) program module 726 may be stored in, for example, the memory 728. Such program module 726 includes but is not limited to an operating system, at least one application program, other program modules, and program data. In these examples, each one or some combination may include the realization of the network environment. The program module 726 generally executes the functions and/or methods in the embodiments described in this application.

The computer device 712 can also communicate with at least one external device 714 (such as a keyboard, a pointing device, a camera, a display 724, etc.), and can also communicate with at least one device that enables a user to interact with the computer device 712, and/or communicate with any device (such as a network card, a modem, etc.) that enables the computer device 712 to communicate with at least one other computing device. This communication may be performed through an Input/Output (I/O) interface 722. Further, the computer device 712 may also communicate with at least one network, e.g., a Local Area Network (LAN), a Wide Area the Network (WAN), and/or a public network such as the Internet, through a network adapter 720. As shown in the drawings, the network adapter 720 communicates with other modules of the computer device 712 through the bus 718. It should be understood that although not shown in the drawings, other hardware and/or software modules may be used in conjunction with the computer device 712, including but not limited to: microcode, device drivers, redundant processing units, external disk drive arrays, and Redundant Arrays of Independent Disks (RAID) systems, tape drives, and data backup storage systems.

The processor 716 executes various functional applications and data processing by running programs stored in the memory 728, such as implementing the method for reconstructing a 3D model from 2D images provided in the foregoing embodiment of this application.

The fifth embodiment of this application also provides a computer-readable storage medium on which a computer program is stored. When the program is executed by a processor, the method for reconstructing a 3D model from 2D images as provided in the embodiments of this application is realized.

Of course, the computer programs stored on the computer-readable storage medium according to the embodiments of this application are not limited to the above-mentioned method operations and can also execute related operations in the method for reconstructing the 3D model from the 2D images according to any embodiment of this application.

The computer storage medium according to the embodiments of this application may adopt any combination of at least one computer-readable medium. The computer-readable medium may be a computer-readable signal medium or a computer-readable storage medium. The computer-readable medium may be, for example, but not limited to, electrical, magnetic, optical, electromagnetic, infrared, or semiconductor system, apparatus, or device, or any combination of the above. More specific examples (non-exhaustive list) of computer-readable storage media include: an electrical connection with at least one wire, a portable computer disk, a hard disk, a random access memory (RAM), a read only memory (ROM), an erasable programmable read-only register, e.g., an Erasable Programmable Read Only Memory (EPROM) or a Flash memory, an optical fiber, a portable Compact Disc Read-Only Memory (CD-ROM), an optical storage device, a magnetic storage device, or any suitable combination of the above. In this application, the computer-readable storage medium may be any tangible medium that contains or stores a program, and the program may be used by or in combination with an instruction execution system, apparatus, or device.

The computer-readable signal medium may include a data signal propagated in baseband or as a part of a carrier wave, and computer-readable program codes are carried therein. This propagated data signal can take many forms, including but not limited to electromagnetic signals, optical signals, or any suitable combination of the foregoing. The computer-readable signal medium may also be any computer-readable medium other than the computer-readable storage medium, and the computer-readable medium may send, propagate, or transmit the program for use by or in combination with the instruction execution system, apparatus, or device.

Computer readable program codes embodied on a medium may be transmitted using any appropriate medium, including but not limited to wireless, wireline, optical fiber cable, Radio Frequency (RF), etc., or any suitable combination of the above.

The computer program codes used to perform the operations of this application may be written in one or more programming languages or a combination thereof. The programming languages include object-oriented programming languages, such as Java, Smalltalk, C++, and also conventional procedural programming languages, such as "C" language or similar programming languages. The program codes may be executed entirely on the user's computer, partly on the user's computer, executed as an independent software package, partly on the user's computer and partly executed on a remote computer, or entirely executed on the remote computer or server. In the latter scenario, the remote computer, the remote computer through any type of network, including a local area network (LAN) or a wide area network (WAN), is connected to the user's computer or may be connected to an external computer (e.g., connected via Internet using an Internet Service Provider).

What is claimed is:

1. A method for reconstructing a 3D model from 2D images, comprising:
   obtaining two-dimensional images respectively corresponding to at least two viewing angles of a three-dimensional object; and
   inputting the two-dimensional images respectively corresponding to the at least two viewing angles into a set neural network for information fusion and 3D model reconstruction so as to obtain a 3D model of the three-dimensional object; wherein the obtaining two-dimensional images respectively corresponding to at least two viewing angles of a three-dimensional object comprises:
   extracting initial two-dimensional images respectively corresponding to the at least two viewing angles of the three-dimensional object from a digital literature;
   preprocessing the initial two-dimensional images to obtain target two-dimensional images respectively corresponding to the at least two viewing angles; and
   associating the target two-dimensional images with viewing angle information,
   wherein the inputting the two-dimensional images respectively corresponding to the at least two viewing angles into a set neural network for information fusion and 3D model reconstruction comprises:
   inputting the target two-dimensional images associated with the viewing angle information into the set neural network for the information fusion and the 3D model reconstruction.

2. The method according to claim 1, wherein the extracting initial two-dimensional images respectively corresponding to the at least two viewing angles of the three-dimensional object from a digital literature comprises:
   extracting image titles from the digital literature; and standardizing the image titles so as to obtain image types of the initial two-dimensional images.

3. The method according to claim 2, wherein the extracting image titles from the digital literature and standardizing the image titles so as to obtain image types of the initial two-dimensional images comprises:
   locating information of drawing description in the digital literature;
   extracting drawing descriptions and drawing numbers from the located information of drawing description; and
   obtaining image types of the two-dimensional images from the extracted information of drawing description, standardizing the image types, and taking the image types of the standardized two-dimensional images as the image types of the initial two-dimensional images.

4. The method according to claim 3, wherein the locating information of drawing description in the digital literature comprises:
   dividing a content of a set part of the digital literature into multiple content pairs using a content parser, a content pair including a section title and a section content; and
   locating the information of drawing description based on a preset category table according to the section titles.

5. The method according to claim 3, wherein extracting drawing descriptions and drawing numbers from the located information of drawing description comprises:
   extracting the drawing description using a pre-built Regular Expression; and
   obtaining a drawing numbering mode using a mode matching method, and extracting the drawing numbers according to the drawing numbering mode.

6. The method according to claim 5, wherein the drawing numbering mode includes a first mode and a second mode, the drawing number of the first mode is composed of at least one separated number, and the drawing number of the second mode is composed of a number range;
   in the case of the drawing numbering mode being the first mode, extracting the drawing numbers according to the drawing numbering mode comprises: extracting at least one separated number, and determining the at least one separated number as the drawing number;
   in the case of the drawing numbering mode being the second mode, extracting the drawing numbers according to the drawing numbering mode comprises: dividing the number range, obtaining multiple numbers included in the number range, and determining the multiple numbers included in the number range as the drawing numbers.

7. The method according to claim 1, wherein the preprocessing the initial two-dimensional images to obtain target two-dimensional images respectively corresponding to the at least two viewing angles comprises:
   preforming image cropping on the initial two-dimensional images to obtain the target two-dimensional images respectively corresponding to the at least two viewing angles;
   wherein the associating the target two-dimensional images with viewing angle information comprises:
   obtaining view types of the target two-dimensional images respectively corresponding to the at least two viewing angles after being orthogonal projected, and determining the view types of the target two-dimensional images respectively corresponding to the at least two viewing angles after being orthogonal projected as the viewing angle information; and
   associating the target two-dimensional images with the viewing angle information.

8. The method according to claim 1, wherein the set neural network comprises a first convolution sub-network, a second convolution sub-network, and an information fusion sub-network; the first convolution sub-network and the second convolution sub-network are respectively connected to the information fusion sub-network;
   the inputting the two-dimensional images respectively corresponding to the at least two viewing angles into a set neural network for information fusion and 3D model reconstruction so as to obtain a 3D model of the three-dimensional object comprises:
   inputting the two-dimensional images respectively corresponding to the at least two viewing angles into the first convolution sub-network to obtain a depth map and a surface normal map;
   inputting the two-dimensional images respectively corresponding to the at least two viewing angles into the second convolution sub-network for feature extraction to obtain key features; and
   inputting the depth map, the surface normal map and the key features into the information fusion sub-network to perform the information fusion and the 3D model reconstruction so as to obtain the 3D model of the three-dimensional object.

9. The method according to claim 8, wherein the 3D model comprises at least one of the following: a 3D point cloud, a grid 3D surface, and a Computer-Aided Design (CAD) model.

10. The method according to claim 9, wherein in the case of the 3D model being the CAD model, the inputting the depth map, the surface normal map and the key features into the information fusion sub-network to perform the information fusion and the 3D model reconstruction so as to obtain the 3D model of the three-dimensional object comprises:
  aligning the depth map and the surface normal map respectively with the key features to obtain a vector form of the key features; and
  generating the CAD model according to the vector form of the key features.

11. The method according to claim 8, wherein before obtaining two-dimensional images respectively corresponding to at least two viewing angles of a three-dimensional object, the method further comprises:
  obtaining a training sample set, the training sample set including multiple reference 3D models and two-dimensional images respectively corresponding to at least two viewing angles based on the multiple reference 3D models; and
  training the set neural network according to the training sample set.

12. The method according to claim 11, wherein the training the set neural network according to the training sample set comprises:
  inputting the two-dimensional images corresponding to the at least two viewing angles into the first convolution sub-network to obtain a training depth map and a training surface normal map;
  inputting the two-dimensional images corresponding to the at least two viewing angles into the second convolution sub-network for feature extraction to obtain training key features;
  inputting the training depth map, the training surface normal map, and the training key features into the information fusion sub-network for information fusion and 3D model reconstruction to obtain a predicted 3D model; and
  adjusting parameters in the set neural network according to the predicted 3D model and the reference 3D models, until the training ends.

13. The method according to claim 1, wherein after the 3D model of the three-dimensional object is obtained, the method further comprises-one of the following:
  storing the 3D model in a database after associating the 3D model with the digital literature, and establishing search index information for the 3D model; searching the digital literature associated with the 3D model according to 3D model searching information inputted by a user; or,
  conducting CAD modeling according to the 3D model; or,
  conducting 3D printing according to the 3D model.

14. A computer device comprising a memory, a processor, and a computer program stored on the memory and capable of running on the processor, when the computer program is executed by the processor, the method of reconstructing a 3D model from 2D images according to claim 1 is implemented.

15. A non-transitory computer-readable storage medium with a computer program stored thereon, and when the computer program is executed by a processor, the method for reconstructing a 3D model from 2D images according to claim 1 is implemented.

* * * * *